(12) United States Patent
Mohrmann, III

(10) Patent No.: US 8,966,308 B2
(45) Date of Patent: Feb. 24, 2015

(54) SYSTEM AND METHOD FOR CLOCK DOMAIN MANAGEMENT

(75) Inventor: Leonard E. Mohrmann, III, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 2686 days.

(21) Appl. No.: 11/465,637

(22) Filed: Aug. 18, 2006

(65) Prior Publication Data

US 2008/0043752 A1 Feb. 21, 2008

(51) Int. Cl.
*G06F 1/00* (2006.01)
*G06F 1/08* (2006.01)

(52) U.S. Cl.
CPC .................................. *G06F 1/08* (2013.01)
USPC ........................... 713/500; 713/501; 710/100

(58) Field of Classification Search
USPC ................................. 713/500, 501; 710/100
See application file for complete search history.

(56) References Cited

U.S. PATENT DOCUMENTS

| | | | | |
|---|---|---|---|---|
| 3,980,318 | A * | 9/1976 | Balban | 280/735 |
| 5,455,923 | A * | 10/1995 | Kaplinsky | 711/154 |
| 5,572,110 | A * | 11/1996 | Dunstan | 320/106 |
| 5,742,644 | A * | 4/1998 | Campana, Jr. | 375/316 |
| 5,790,876 | A * | 8/1998 | Shima et al. | 713/320 |
| 5,871,858 | A * | 2/1999 | Thomsen et al. | 429/7 |
| 6,112,275 | A * | 8/2000 | Curry et al. | 711/100 |
| 6,653,816 | B2 * | 11/2003 | Peek et al. | 320/132 |
| 6,677,727 | B1 * | 1/2004 | Wendelrup et al. | 320/112 |
| 6,681,278 | B1 * | 1/2004 | Jakl | 710/100 |
| 6,728,793 | B1 * | 4/2004 | McRobert et al. | 710/8 |
| 6,768,386 | B1 | 7/2004 | Miller | 331/1 |
| 6,810,338 | B2 * | 10/2004 | Mercke et al. | 702/63 |
| 6,831,444 | B2 * | 12/2004 | Kobayashi et al. | 320/136 |
| 6,874,047 | B1 * | 3/2005 | Duguay et al. | 710/100 |
| 6,954,809 | B2 * | 10/2005 | Kuo | 710/107 |
| 7,005,892 | B2 | 2/2006 | Afghahi et al. | 326/86 |
| 7,039,150 | B1 * | 5/2006 | Drori | 375/377 |
| 7,071,737 | B2 | 7/2006 | Kawasumi et al. | 327/51 |
| 7,127,638 | B1 * | 10/2006 | Sardella et al. | 714/15 |
| 7,138,785 | B2 * | 11/2006 | Brotto et al. | 320/106 |
| 7,170,257 | B2 * | 1/2007 | Oh | 320/106 |
| 7,454,603 | B2 * | 11/2008 | Stevens et al. | 713/1 |
| 7,516,252 | B2 * | 4/2009 | Krithivas | 710/37 |
| 7,667,429 | B2 * | 2/2010 | Little | 320/106 |
| 2001/0035782 | A1 * | 11/2001 | Nakano | 327/165 |
| 2003/0158934 | A1 * | 8/2003 | Chang | 709/224 |
| 2003/0227310 | A1 * | 12/2003 | Iwata | 327/165 |
| 2004/0263217 | A1 * | 12/2004 | Hutson et al. | 327/99 |
| 2007/0061491 | A1 * | 3/2007 | Kerdemelidis et al. | 710/1 |
| 2009/0010379 | A1 * | 1/2009 | Chiang et al. | 377/64 |
| 2009/0132880 | A1 * | 5/2009 | Wang et al. | 714/731 |

* cited by examiner

*Primary Examiner* — Zahid Choudhury
(74) *Attorney, Agent, or Firm* — Terrile, Cannatti, Chambers & Holland, LLP; Robert W. Holland

(57) ABSTRACT

A source clock system clock domain is selected by communication of the desired clock domain from a receiver clock system through a clock line, such as through a clock differential pair. For instance, the source clock system signals available clock domains by selectively altering the polarity of a first clock line of the pair and the receiver clock system selects from the available clock domains by altering the polarity of a second clock line of the pair. Polarity is altered by selectively interfacing a resistor with the clock lines and then removing the resistor interface when the clock signal associated with the selected clock domain is sent by the source clock system.

14 Claims, 5 Drawing Sheets

SYSTEM AND METHOD FOR CLOCK DOMAIN MANAGEMENT

BACKGROUND OF THE INVENTION

1. Field of the Invention

The present invention relates in general to the field of information handling clocking, and more particularly to a system and method for clock domain detection and behavior between information handling system devices.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system performance has steadily improved as components used to build information handling systems have improved their ability to process information. In order to take full advantage of this improved component processing capabilities, information handling systems have incorporated buses that communicate information at greater rates typically involving increased bus clock speeds. One difficulty with the more powerful components and improved bus speeds is that information handling systems tend to generate greater amounts of incidental electromagnetic energy. Government regulatory agencies, such as the Federal Communications Commission (FCC), enforce limits on the amount of electromagnetic interference (EMI) that information handling systems are allowed to emit. To meet these EMI limitations, information handling systems are typically designed to have shielding that blocks emission of electromagnetic energy. In addition, component and bus configurations are selected based on their electromagnetic characteristics so that a manufactured information handling system meets desired EMI restrictions. As an example, spread spectrum signaling is often uses to communicate between components to lower the EMI signature of the components.

One difficulty with spread spectrum signaling is that it generally requires a common-clock environment for the interfaced system components. For example, PCI-Express provides gigabit data communication with spread spectrum signaling. This method of clocking has limitations imposed by differential jitter characteristics. The phase of the spread spectrum induced clock modulation changes relative to the distance from a source clock generator and the phase delay between two target components that are communicating information. If target components are significantly delayed from each other, then the phase difference creates jitter between the two components such that the components may not be able to communicate reliably. One technique for counteracting jitter effects in long-distance links, such as Ethernet and Fibre Channel, uses precision local clock sources for each end of a bus so that the clocks are never too far out of synch and clock induced jitter is kept to a minimum. Other techniques include the use of auxiliary signals, GPIOs or 12C buses to define clock domains for multi-configurable systems. USB components use a bias in which a downstream component drives one of a differential pair of data lines high to indicate data speed capability. Information handling system manufacturers often face difficulty in coordinating clock domain management for different types of components.

SUMMARY OF THE INVENTION

Therefore a need has arisen for a system and method which provides clock domain management for communicating information between information handling system components.

In accordance with the present invention, a system and method are provided which substantially reduce the disadvantages and problems associated with previous methods and systems for providing clock domain management for communicating information between information handling system components. Clock domain information is communicated across a clock line by selectively interfacing a resistor with the clock line. For instance, a clock domain for use at a bus is selected through communication over the clock line and the selected clock signal is sent over the clock line after the resistor is isolated from the clock line.

More specifically, a source clock system provides a selected of plural clock domain clock signals to a receiver clock system over a differential pair of clock lines to support communication between information handling system components over a bus, such as a PCI Express bus. A clock domain requester associated with the receiver clock system indicates a desired clock domain by altering the polarity of a clock line, such as by interfacing a resistor with the clock line. A clock domain selector associated with the source clock system detects the altered polarity and applies the clock domain selection to provide a clock signal associated with the clock domain to the clock line. In one embodiment, the clock domain selector communicates available clock domains to the receiver clock system by altering polarity of a clock line at the source clock system. The resistors used to alter clock line polarity are isolated from the clock lines before initialization of the clock signal. Selectable clock domains include, for instance, a spread spectrum clock domain, a predetermined frequency clock domain, a precision clock domain, a reference clock domain and a data driven clock domain.

The present invention provides a number of important technical advantages. One example of an important technical advantage is that components communicate clock capabilities by adjusting the polarity of a differential clock pair to signal the clock capabilities to each other before clock operation. Communication of clock capabilities through clock lines allows a clock driver to act as a multi-purpose device. Information handling system components can communicate a variety of clock capabilities between each other, such as the ability to use a common clock, the use of a data driven clock or the availability of a precision clock. Using the clock lines themselves to communication clock domain information reduces the complexity of establishing clock domain management interfaces and increases the flexibility of clock drivers for managing a diversity of systems in a variety of operating configurations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Managing clock domains with communication over clock lines improves the flexibility of clocks used to support communication of information over information handling system buses. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display, the components interfaced with cables to communicate information. The information handling system may also include one or more buses operable to transmit communications between the various hardware components.

Figure 1:
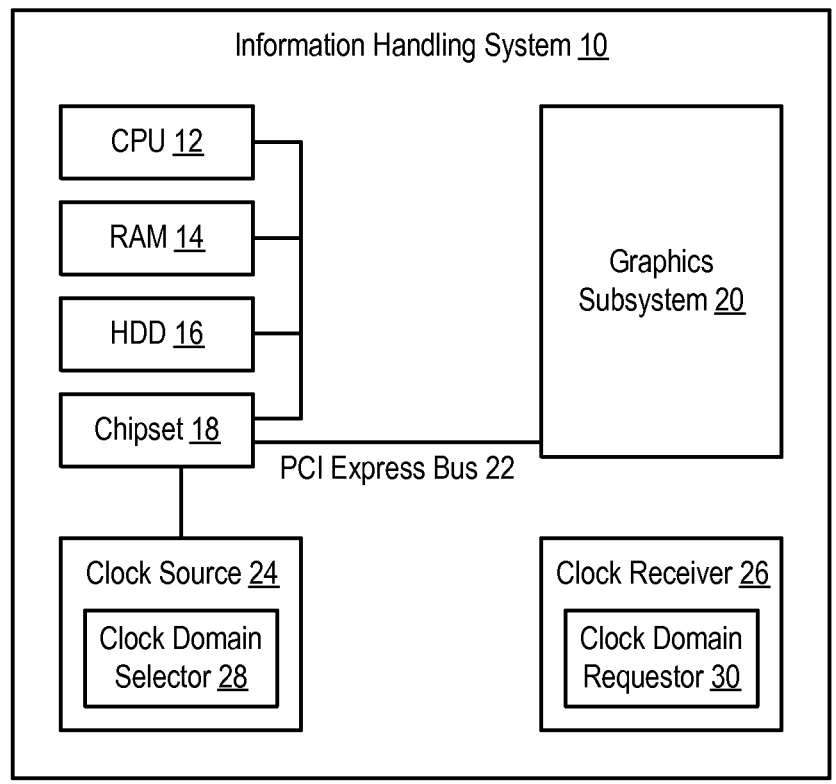
FIG. 1 depicts a block diagram of an information handling system having selectable clock domains.

Referring now to FIG. 1, a block diagram depicts an information handling system 10 having selectable clock domains. Information handling system 10 has plural processing components to process information, such as a CPU 12, RAM 14, a hard disk drive 16, a chipset 18 and a graphics system 20. For example, CPU 12 processes visual information stored in RAM 14 and hard disk drive 16 for communication through chipset 18 to graphics system 20. A PCI Express bus 22 communicates the visual information so that graphics subsystem 20 can present visual images at a display. PCI Express bus 22 communicates the visual information with a clock source 24 associated with chipset 18 and a clock receiver 26 associated with graphics subsystem 20. Clock source 24 has plural clock domains, each clock domain providing an associated clock signal. A clock domain selector 28 associated with clock source 24 selects the clock domain for use on PCI Express bus 22 in accordance with the clock domain requested by a clock domain requester 30 associated with clock receiver 26. In one embodiment, clock domain selector 28 communicates the available clock domains to clock domain requester 30. Clock domain selector 28 and clock domain requester 30 communicate by altering the polarity of the clock line that interfaces them. For PCI Express bus 22, examples of clock domains include a spread spectrum clock domain and a predetermined frequency clock domain. In alternative embodiments, other types of buses are provided with other types of clock domains, such as precision clock domains and data driven clock domains. Alternative buses may include defined or future bus architectures such as any serialized data link.

Figure 2:
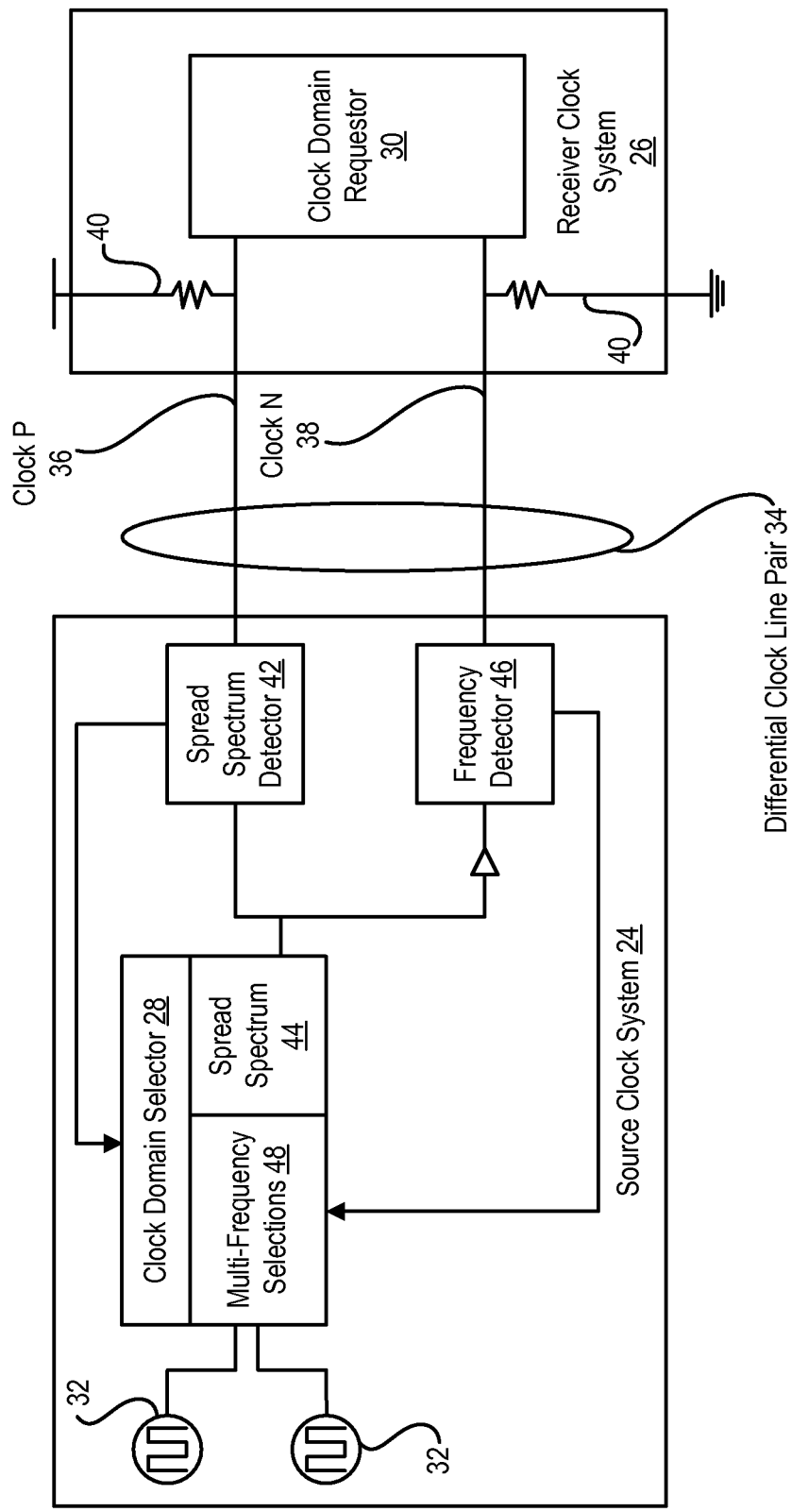
FIG. 2 depicts a block diagram of a system for selecting between spread spectrum and predetermined frequency clock domains.

Referring now to FIG. 2, a block diagram depicts a system for selecting between spread spectrum and predetermined frequency clock domains. Source clock system 24 has plural clocks that provide either a spread spectrum clock domain or a single frequency clock domain at a predetermined clock frequency. The clock signal associated with each clock domain is communicated over a differential clock line pair 32 to receiver clock system 26. Clock domain requester 30 communicates a request for a spread spectrum clock domain through the clock P line and communicates a request for a predetermined frequency clock domain through the clock N line 38. The request for each clock domain is communicated by selectively interfacing a resistor 40 with each respective clock line to alter the clock line's polarity. Altered polarity on clock P line 36 is detected by a spread spectrum detector 42 and communicated to spread spectrum logic 44 in clock domain selector 28 to initiate a spread spectrum clock signal. Altered polarity on clock N line 38 is detected by a frequency detector 46 and communicated to multi-frequency selections logic 48 for to initiate a clock having a predetermined frequency. In one embodiment, selection of a specific frequency is provided by selectively interfacing resistor 40 to send serialized bits of information. Once the desired clock domain is communicated, resistors 40 are isolated from clock line pair 34 and the associated clock signal is initiated by source clock system 24. Receiver clock system 26 provides parasitic load balancing circuits in its control logic to present common mode noise. As an example, an application specific integrated circuit (ASIC) incorporates logic to selectively interface resistors 40 and provide parasitic load balancing.

Figure 3:
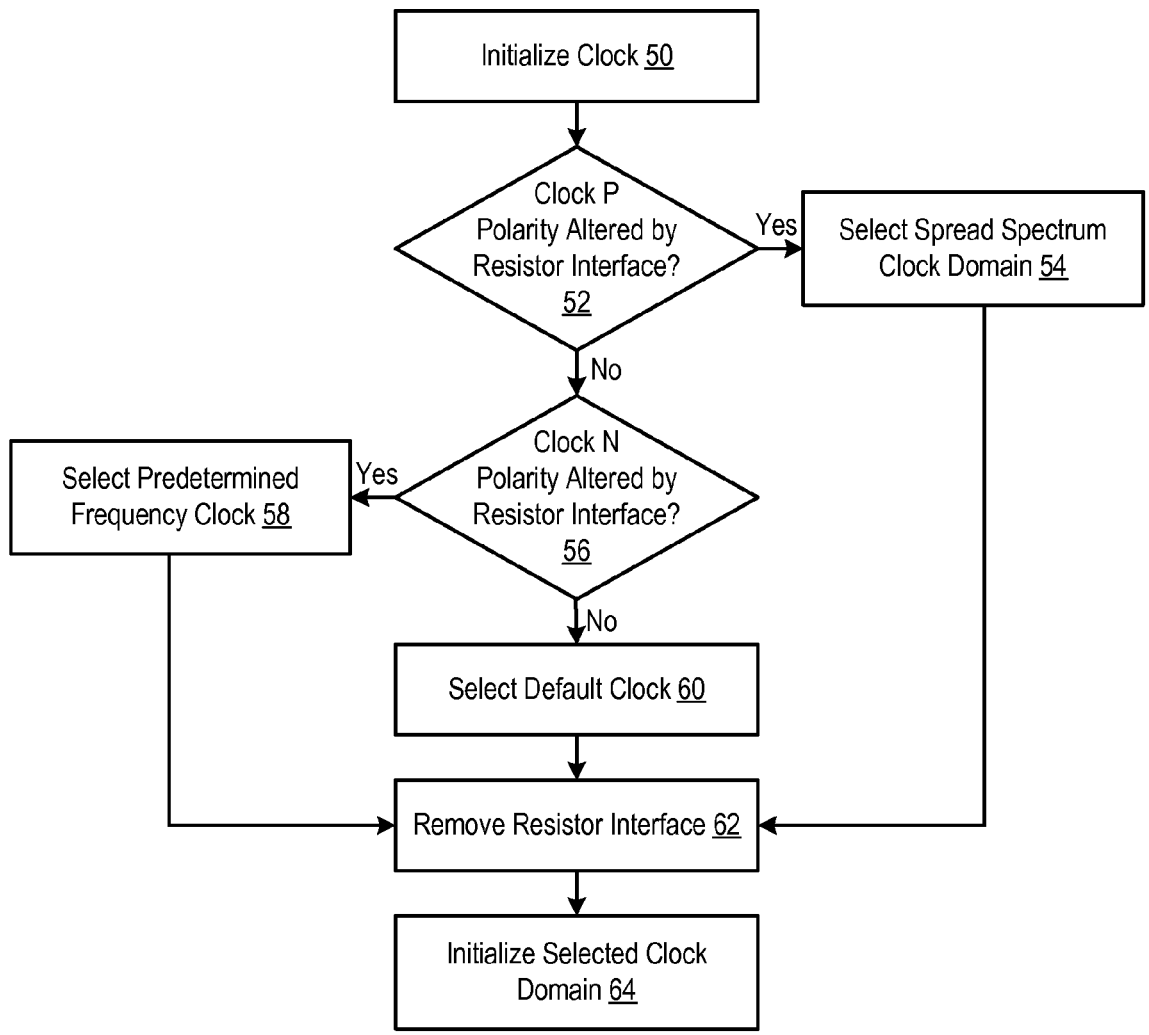
FIG. 3 depicts a flow diagram of a process for selecting between spread spectrum and predetermined frequency clock domains.

Referring now to FIG. 3, a flow diagram depicts a process for selecting between spread spectrum and predetermined frequency clock domains. The process begins at step 50 with initialization of the clock. At step 52, the source clock system checks the clock P line polarity to see if it is altered by the interfacing of a resistor. If the polarity of clock P line is altered, the process continues to step 54 to select the spread spectrum clock domain. If the polarity of clock P line is not altered, the process continues to step 56 to check if the polarity of clock N line is altered by the interfacing of a resistor. If the polarity of clock N line is altered, the process continues to step 58 to select a predetermined frequency clock domain. If the polarity of clock N line is not altered, the process continues to step 60 to select a default clock domain. At step 62, the resistor interface is removed from the clock lines to allow normal clock operation. At step 64, a clock signal is initialized for the selected clock domain.

Figure 4:
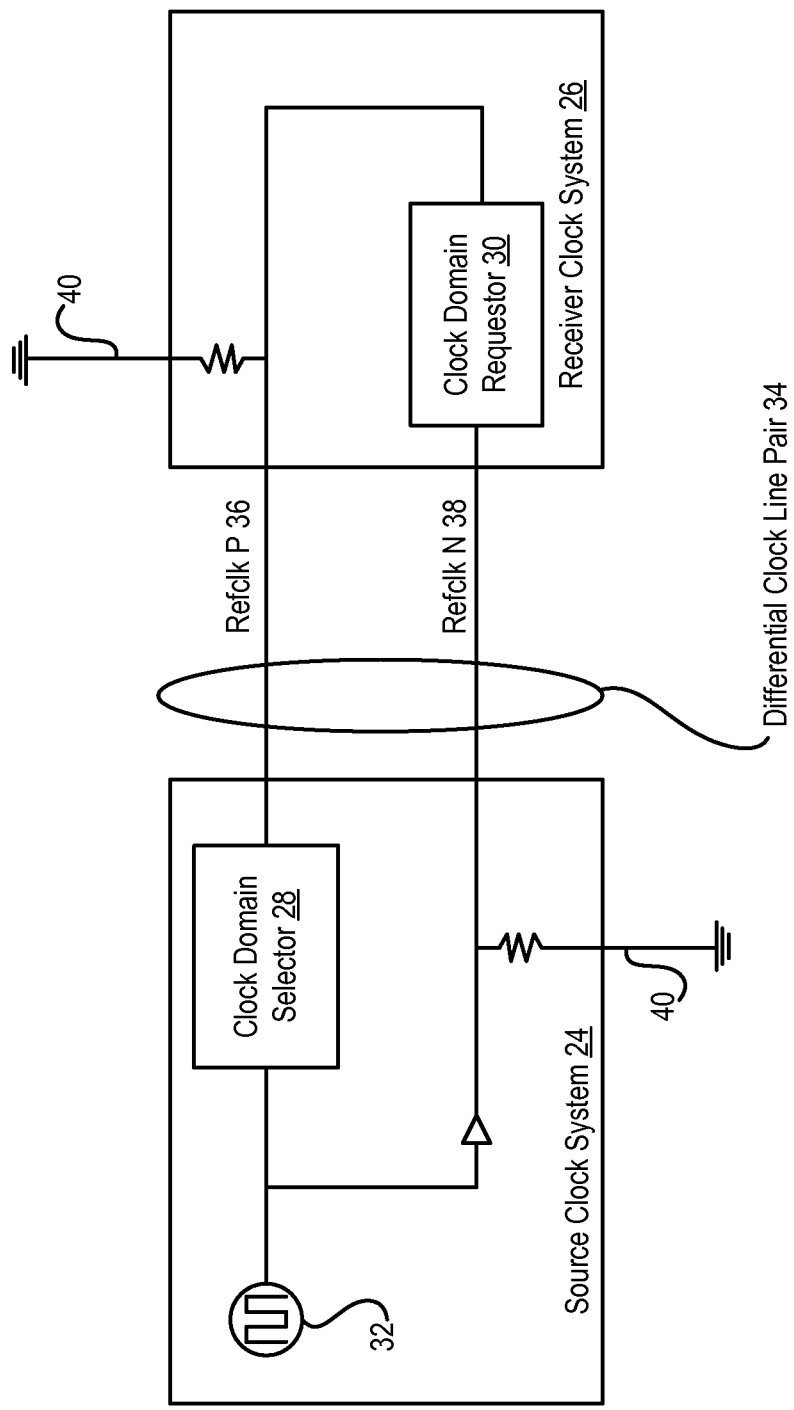
FIG. 4 depicts a block diagram of a system for selecting between a precision clock system and a reference clock system.

Referring now to FIG. 4, a block diagram depicts a system for selecting between a precision clock system and a reference clock system. A first resistor 40 selectively interfaces with Refclk P 36 at receiver clock system 26 and a second resistor 40 interfaces with Refclk N 38 at source clock system 24. Setting a high polarity across Refclk P 36 indicates from clock domain requester 30 to clock domain selector 28 that receiver clock system 26 uses a reference clock while setting a low polarity across Refclk P 36 indicates that receiver clock system 26 requires a reference clock. Setting a high polarity across Refclk N 38 indicates from clock domain selector 28 that source clock system 24 has a precision clock capability while setting a low polarity indicates that source clock system 24 lacks a precision clock capability. Thus if both Refclk P 36 and Refclk N 38 have a high polarity setting by the interfacing of resistors 40, then both source clock system 24 and receiver clock system 26 are precision clock capable so that a precision clock domain is selected. If either or both of Refclk P 36 or Refclk N 38 have a low polarity, then at least one of the source clock system 24 or receiver clock system 26 are not precision clock capable and source clock system 24 provides a reference clock instead of a precision clock.

Figure 5:
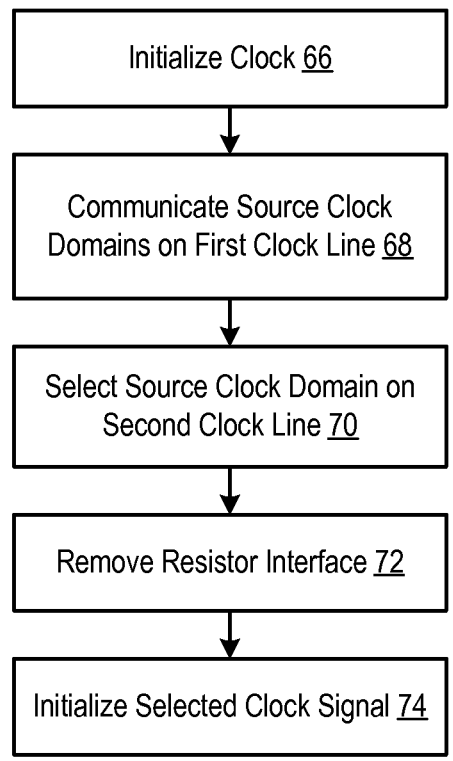
FIG. 5 depicts a flow diagram of a process for selecting between a precision clock system and a reference clock system.

Referring now to FIG. 5, a flow diagram depicts a process for selecting between a precision clock system and a reference clock system. The process begins at step 66 with initialization of the clock. At step 68, the available source clock domains are communicated on a first clock line of a differential clock pair by altering the line polarity, such as the availability of a precision clock domain. At step 70, the source clock domain is selected by the receiver clock system from available domains indicated by the source clock system. For example, if the source clock system indicates that a precision clock is available, the receiver clock system selects a precision clock domain by indicating the presence of a reference clock at the receiver clock system. In contrast, the receiver clock system selects use of a reference clock from the source clock by indicating the lack of a presence of a reference clock. At step 72, the resistor interfaces used to signal clock domain management information are removed to avoid interference with clock operation and, at step 74 the selected clock signal is initialized.

Although the present invention has been described in detail, it should be understood that various changes, substitutions and alterations can be made hereto without departing from the spirit and scope of the invention as defined by the appended claims.

What is claimed is:

1. A method for managing a clock domain of a clock supporting communication of information between plural information handling system components over a bus, the method comprising:
    selectively interfacing a ground with a clock line at the clock source to indicate available clock domains to the clock receiver;
    selectively interfacing a ground with a clock line at a clock receiver to request a desired clock domain from a clock source;
    receiving the request at the clock source;
    removing the ground interface with the clock line; and
    applying the requested clock domain to the clock line with the clock source for use by the clock receiver.

2. The method of claim 1 wherein the clock domain comprises spread spectrum signaling.

3. The method of claim 1 wherein the clock domain comprises a data driven clock.

4. The method of claim 1 wherein the clock domain comprises a precision clock.

5. The method of claim 1 wherein the bus comprises a serialize data link.

6. The method of claim 1 wherein the clock source comprises a differential pair of clock lines operable to provide a clock signal to the clock receiver.

7. The method of claim 6 further comprising:
    adding parasitic loading to the clocks for supporting communication of the clock signal.

8. A system for managing a clock domain of a clock supporting communication of information between plural information handling system components over a bus, the system comprising:
    a source clock system operable to provide a clock signal to one or more clock lines, the clock signal selectable from plural clock domains;
    a receiver clock system operable to receive the clock signal from the clock lines;
    a clock domain requester associated with the receiver clock system, the clock domain requester operable to selectively alter the polarity of a clock line to communicate a clock domain request through the clock line; and
    a clock domain selector associated with the source clock system, the clock domain selector operable to receive the clock domain request through the clock line and to select the clock signal associated with the requested clock domain to the one or more clock lines;
    wherein the clock domain requester selectively alters the polarity of the clock line by selectively interfacing a resistor with the clock line.

9. The system of claim 8 wherein the clock signal comprises a spread spectrum signal.

10. The system of claim 8 wherein the clock signal comprises a predetermined frequency.

11. The system of claim 8 wherein the clock signal comprises a precision clock signal.

12. The system of claim 8 wherein the clock signal comprises a data driven clock signal.

13. A system for managing a clock domain of a clock supporting communication of information between plural information handling system components over a bus, the system comprising:
    a source clock system operable to provide a clock signal to one or more clock lines, the clock signal selectable from plural clock domains;
    a receiver clock system operable to receive the clock signal from the clock lines;
    a clock domain requester associated with the receiver clock system, the clock domain requester operable to selectively alter the polarity of a clock line to communicate a clock domain request through the clock line; and
    a clock domain selector associated with the source clock system, the clock domain selector operable to receive the clock domain request through the clock line and to select the clock signal associated with the requested clock domain to the one or more clock lines;
    wherein the clock domain selector is further operable to selectively alter the polarity of a clock line at the clock source to indicate available clock domains to the clock receiver.

14. The system of claim 13 wherein the clock domain selector selectively alters the polarity of the clock line at the clock source by selectively interfacing a resistor with the clock line at the clock source.

* * * * *